UNITED STATES PATENT OFFICE.

GALEN H. CLEVENGER, OF PALO ALTO, CALIFORNIA.

FLOTATION PROCESS OF CONCENTRATING.

1,212,130. Specification of Letters Patent. Patented Jan. 9, 1917.

No Drawing. Application filed June 13, 1916. Serial No. 103,558.

*To all whom it may concern:*

Be it known that I, GALEN H. CLEVENGER, a citizen of the United States, residing at Palo Alto, in the county of Santa Clara and State of California, have invented new and useful Improvements in Flotation Processes of Concentrating, of which the following is a specification.

The present invention relates to improvements in processes of concentrating ores of gold, silver, copper, lead, zinc, mercury, and the like, by flotation.

I have discovered that certain of the products of the destructive distillation, or of steam distillation of black sage (*Ramona stachyordes*), wild sage (*Artemisia frigida* Willd.), *Artemisia tridentata*, etc., also variously known as mountain sage, pasture sage brush and wormwood sage, as well as other varieties of sage common to the western arid regions, the whole of the shrub being in each case subjected to distillation, are peculiarly valuable for use as frothing and collecting agents in the well known flotation process of concentrating ores.

I have found the principal products of the destructive distillation of the variety of sage known as *Artemisia tridentata* to be acid liquor, alkaline liquor, gas, charcoal, and a liquid which I may term "tar oil," although the product in no way resembles either tar or oil, except that it is black and of a thicker consistency than water. The tar oil and acid liquor are especially useful as flotative agents, while the gas and charcoal may be utilized as fuel for carrying on the operation of distillation. The impure alkalis resulting from the burning of the charcoal can be used as a reagent for sharpening the separation between the concentrate and the gangue, thus taking advantage of the previously well known effect of the alkalis upon the flotation of various ores. The so-called tar oil has distinctly different properties from anything with which I am familiar produced through the destructive distillation of hard or soft woods. Possibly this result is caused by the fact that the whole of the shrub is subjected to distillation. It has heretofore been the common practice to subject to distillation the woody portion of a tree with such bark as may be attached, and it has also been the practice to recover oil from eucalyptus trees by the steam distillation of the leaves and short twigs only, while in the case of soft woods, as for example, pine, there is a small industry in the steam-distilled oils from the needles. At times the woody portion of various species of the *Coniferæ* is separately subjected to steam distillation for the production of refined turpentine and pine oil. The leaves and new growth in general contain the essential oils while the woody portion contains the resins and other bodies. In my invention I subject the whole tree or shrub at one operation to distillation. I find the resulting product is more efficient as a flotative agent than that from any of the above prior processes, since a smaller quantity suffices to give a higher extraction than is possible from wood products. The acid liquor produced, while resembling in a general way that produced from wood distillation, is sufficiently different to be classified as a special product. The alkaline liquor produced does not manifest itself in the distillation of ordinary varieties of wood. This liquor has been found to contain approximately 2% of nitrogen, which shows that sage brush belongs to the solitary group of plants known as *Leguminosæ*, which have the power of fixing atmospheric nitrogen. The charcoal ranges from fine dust to pencil-like pieces. This has been found to contain about 10% of ash, very much more ash being present than in the charcoal produced from any common variety of wood. The discovery is of peculiar utility on account of the fact that in arid metalliferous regions sage brush is practically the only natural product from which these flotative agents can be derived, and the discovery therefore removes the necessity of importing other flotative agents in regions in which the cost of transportation is generally high, but which contain valuable mineral deposits in which the flotation process can be advantageously used. The application of both gas and charcoal resulting from the destructive distillation of fuel in distilling is of great importance and is novel so far as I am aware. In prior process only the gas is used or else the gas and tar. The charcoal in all other forms of destructive distillation is one of the most valuable marketable products produced, but in this case it so happens that it has little value, and since the other products are of greater value, it can be used for heating. Furthermore, the alkaline ash derived through the burning of the charcoal is in this case one of the valuable reagents which at times could be applied in the practice of flotation.

The oil resulting from the steam distillation of the various varieties of sage common to the western arid regions is also a valuable frothing and collecting agent. On the whole, however, the products of destructive distillation of these varieties of sage are far more useful in flotation than those of steam distillation, because the yield is greater, and the expense of carrying on the operation is much less, since the gas and charcoal can be utilized to a great extent for heating the retorts.

A sample of zinc ore from the Butte and Superior mine, Butte, Montana, containing 22.39% zinc was ground to 100 mesh and tested in a Janney laboratory machine, employing a 0.25% solution of sulfuric acid and sage tar oil. 97% of the zinc was extracted. The first concentrate contained 58.8% of zinc, the second 48.9%, the third 40.5% and the fourth 18.1%. The oil consumption was at the rate of 0.4 lb. per ton of ore. A sample of mercury ore from the New Almaden mine, California, containing 0.26% mercury was ground to 80 mesh and tested in a Janney laboratory machine, employing a 0.2% solution of sodium carbonate and sage tar oil. 90% of the mercury was extracted. The first concentrate contained 3.6% of mercury, the second 2.5%, the third 1.55% and the fourth 0.95%. The oil consumption was at the rate of 1 lb. per ton of ore. A sample of lead ore from the Coeur d'Alene district, containing 12% lead was ground to 100 mesh and tested in a Janney laboratory machine, employing a 0.05% solution of sodium carbonate and sage tar oil. 92.2% of the lead was extracted. The calculated lead content of the total concentrate was 37.3%, and the oil consumption was at the rate of 0.67 lb. per ton of ore. A sample of silver-gold ore from the Ophir mine, Virginia City, Nevada, containing 0.46 oz. gold and 7.4 oz. silver per ton was ground to 100 mesh and tested in a Janney laboratory machine, employing a 0.1% solution of either lime or sodium carbonate, together with sage tar oil. Approximately 90% of the silver and 95% of the gold was extracted. The first concentrate assayed 5.3 oz. gold and 198 oz. silver per ton, the second 3.75 oz. gold and 72.9 oz. silver per ton, and the third 1.32 oz. gold and 35.3 oz. silver per ton. The oil consumption was at the rate of 0.6 lb. per ton of ore. The oil consumption when employing the sage tar oil was less than with other oils experimented with in treating the same ores, and in general the extraction was better. Since it is almost universal experience that large scale operation requires less oil and since the extraction is in general better, these results will be recognized as being unusually good.

I claim:—

1. The method of concentrating ores which consists in distilling sage and utilizing the liquid products of the distillation as flotative agents in the flotation process of concentrating ores.

2. The method of concentrating ores which consists in destructively distilling sage and utilizing the liquid products of the distillation as flotative agents in the flotation process of concentrating ores.

G. H. CLEVENGER.